United States Patent Office 3,660,260
Patented May 2, 1972

3,660,260
PHOTOSYNTHESIS OF ALKOXYOXETANES
Sigfried H. Schroeter, Schenectady, N.Y., assignor to
General Electric Company
No Drawing. Original application Sept. 29, 1967, Ser. No.
671,576. Divided and this application Apr. 27, 1970,
Ser. No. 43,282
Int. Cl. B01j 1/10
U.S. Cl. 204—158 R                                  6 Claims

ABSTRACT OF THE DISCLOSURE

Alkoxyoxetanes are produced by the reaction of an aldehyde or ketone with a vinyl ether in the presence of ultraviolet light. The alkoxyoxetanes produced in accordance with this invention are useful as solvents for chemical reactions and as monomers for polymerization to polyoxyalkylene compounds employing, for example, trialkyl aluminum compounds with water in accordance with known processes.

---

This application is a division of my copending application, Ser. No. 671,576, filed Sept. 29, 1967, now abandoned, entitled Photosynthesis of Alkoxyoxetanes.

In accordance with the process of the present invention, alkoxyoxetanes can be produced in good yields by irradiating a mixture of a vinyl ether of the formula I 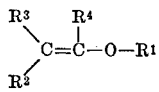

wherein $R^1$ is a monovalent hydrocarbon radical or a halogenated monovalent hydrocarbon radical and $R^2$, $R^3$ and $R^4$ are hydrogen or an $R^1$ group with a carbonyl compound of the formula II 

wherein R is a member of the class consisting of alkyl groups containing from 1 to 18 or more carbon atoms and aryl groups and R' is hydrogen or an R group, or a cycloaliphatic carbonyl compound of the formula III 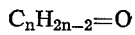

where $n$ is an integer of from 4 to 18, with ultraviolet light having a wavelength of from 2000 to 3700 angstroms.

The process of this invention is more readily illustrated by the following equation which for simplicity shows the reaction of acetone with vinyl ethyl ether

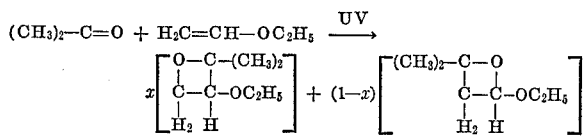

where $x$ is a fraction. As can be seen from the equation, 1 mole of the acetone reacts with 1 mole of the vinyl ethyl ether to yield a total of 1 mole of the isomeric oxetanes.

The ratio of the aldehyde or ketone to the vinyl ether employed in the process of this invention is not narrowly critical and can range from as little as 1 to 100 parts, by weight, of the aldehyde or ketone to 100 to 1 part, by weight, of the vinyl ether.

A solvent is not necessary in conducting the process of this invention; either the carbonyl compound or the vinyl ether may serve as a solvent. However, a solvent can be employed if desired. If one employs a solvent in the process of this invention, one can employ on a weight basis, from 1 to 1000 parts of the solvent per 100 parts of the reactants. The solvents other than the reactants, which are useful in conducting the process of this invention are those liquids in which the reactants and the reaction products are soluble and which do not absorb ultraviolet light in the region where the carbonyl reagent absorbs ultraviolet light and which are not affected by ultraviolet light. Such solvents will vary with the nature of the carbonyl compound used. Examples of such solvents are pentane, hexane, benzene, diethyl ether, dibutyl ether, acetonitrile, tetrahydrofuran, N,N-dimethylformamide, etc.

The temperature at which the process of this invention is conducted is not critical. Temperatures from as low as −60° C. to as high as 200° C. or more can be employed in the process of this invention. It is preferred, however, to conduct the process at ambient temperatures, that is, at temperatures from 10° C. to 50° C. for simplicity of equipment and operation of the process.

The process of the present invention can be conducted at subatmospheric, atmospheric or superatmospheric pressures. It is preferred, for simplicity and ease of operation, to conduct the process at atmospheric pressure and in the liquid phase.

The monovalent hydrocarbon radicals which $R^1$, $R^2$, $R^3$ and $R^4$ represent include alkyl radicals such as methyl, ethyl, isopropyl, tert-butyl, etc.; alkenyl radicals such as vinyl, crotyl, allyl, methallyl, decenyl, octadecenyl, etc.; cycloalkyl radicals such as cyclopentyl, cyclohexyl, etc.; cycloalkenyl radicals such as cyclopentenyl, cyclohexenyl, cycloheptenyl, etc.; aryl radicals such as phenyl, xenyl, naphthyl, etc.; aralkyl radicals such as benzyl, phenylethyl, phenylpropyl, etc.; alkaryl radicals such as tolyl, xylyl, etc., and the halogenated derivatives thereof which include chloromethyl, gamma-chloropropyl, bromocyclohexyl, perfluorovinyl, chlorocyclohexyl, trifluoropropyl, pentafluorobutyl, dibromophenyl, pentachlorophenyl, α,α,α-trifluorotolyl, etc.

Illustrative of the vinyl ethers of Formula I which can be employed in the process of this invention are, for example, vinyl methyl ether, vinyl ethyl ether, vinyl isopropyl ether, vinyl butyl ether, vinyl phenyl ether, α-phenylvinyl methyl ether, β-phenylvinyl methyl ether, β-methylvinyl ethyl ether, β-methylvinyl naphthyl ether, vinyl tolyl ether, etc.

Illustrative of alkyl groups which R and R' represent are, for example, methyl, ethyl, isopropyl, t-butyl, decyl, undecyl, octadecyl and the like. Illustrative of the aryl groups which R and R' represent are for example, phenyl, naphthyl, xenyl, tolyl, xylyl, etc.

The carbonyl compounds of Formula II which are employed in the process of this invention include ketones and aldehydes. Illustrative of the ketones which can be employed in the process of this invention are, for example, the aliphatic ketones such as acetone, methyl ethyl ketone, diethyl ketone, dipropyl ketone, diisopropyl ketone, diisobutyl ketone, butyl ethyl ketone, etc.; the cyclo ketones of Formula III, for example, cyclobutanone, cyclopentanone, cyclohexanone, cycloheptanone, cyclodecanone, cycloundecanone, and the alkyl-substituted cyclo ketones, etc.; the mixed alkylaryl ketones, for example, phenyl methyl ketone, phenyl ethyl ketone, tolyl ethyl ketone, xylyl butyl ketone, etc.

Illustrative of the aldehydes which can be employed in the process of this invention are, for example, acetaldehyde, propionaldehyde, butyraldehyde, octadecaldehyde, benzaldehyde, etc.

The novel compositions produced in accordance with the process of this invention are those having the formula IV 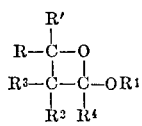

V 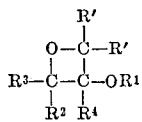

VI 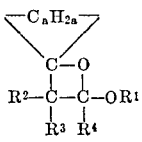

VII 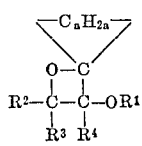

wherein R, R', $R^1$, $R^2$, $R^3$, and $R^4$ are as above defined, and $a$ is equal to $(n-1)$ where $n$ is as above defined.

Illustrative of the oxetanes which are included in Formulas IV, V, VI and VII are, for example, 4,4-dimethyl-2-methoxyoxetane;
4,4-(p-bromo)phenyl-2-n-buotxyoxetane;
4-methyl-4-ethyl-2-propoxyoxetane;
4,4-diethyl-3,3-dimethyl-2-n-butoxyoxetane;
2,2-dimethyl-3-methoxyoxetane;
2,2-diphenyl-3-methoxyoxetane;
2,2-dimethyl-3-iso-butoxyoxetane;
2,2-diethyl-4-phenyl-3-n-butoxyoxetane;
2,2-(p-bromo)phenyl-4-phenyl-3-methyl-3-ethoxyoxetane;
2,2-methyl-4-(p-bromo)-phenyl-3-methyl-3-ethoxyoxetane;
2-methoxy-1-oxaspiro[3.5]nonane;
3-(p-chloro)phenyl-2-ethoxy-1-oxaspiro[3.5]nonane;
2-methoxy-1-oxaspiro[3.7]undecane;
2,3,3-trimethyl-2-methoxy-1-oxaspiro[3.11]pentadecane;
2,2-dimethyl-3-methoxy-1-oxaspiro[3.5]nonane;
3-n-butoxy-1-oxaspiro[3.4]octane;
2-phenyl-2,3-dimethyl-3-ethoxy-oxaspiro[3.5]nonane;
2-phenyl-3-isobutoxy-oxaspiro[3.6]decane;
3-methoxy-1-oxaspiro[3.8]dodecane; etc.

The alkoxyoxetanes produced in accordance with the process of this invention are useful as starting materials in the preparation of polymers containing the polytrimethylene oxide unit. For instance, they may be polymerized by Friedel-Crafts catalysts, for example, in accordance with the procedures described in U.S. Pat. No. 2,905,647, issued Sept. 22, 1959 and U.S. Pat. No. 2,722,520, issued Nov. 1, 1955, or by trialkylaluminum catalysts, for example, as described in U.S. Pat. No. 2,895,921 and No. 2,895,922, issued July 21, 1959. The oxetanes produced by the process of this invention can also be copolymerized with other oxetanes.

The high molecular weight polyoxetanes can then be compounded with fillers and curing agents such as peroxide and the like and cured to elastomers which are useful as gaskets, elastic hoses, electrical insulators, etc.

The oxetanes produced in accordance with this invention can also be homo- or copolymerized with other oxetanes and hydroxyl-containing materials employing a basic catalyst such as potassium hydroxide to yield hydroxyl-terminated polymers which are useful in producing polyurethanes by the reaction with tolylene diisocyanate according to known processes.

The following examples serve to further illustrate the invention. All parts are by weight unless otherwise expressly set forth.

EXAMPLE 1

Acetone (125 ml.) and vinyl ethyl ether (100 g.) were placed in a reaction flask under a blanket of nitrogen and irradiated with an internally water-cooled quartz reactor with a 450 W medium pressure mercury lamp surrounded by a Vycor 7910 glass filter for 24 hours. Unreacted starting material was recovered by distillation through a short Vigreux column at atmospheric pressure (B.P. 50–65° C.) and the residue was distilled in vacuo to yield 51.0 g. of a mixture of alkoxyoxetanes, B.P. 60–80° C./70 mm. Nuclear magnetic resonance analysis indicated this to be a 70:30 mixture of the 3- and 2-ethoxyoxetane. The mixture was distilled through a spinning band column to afford 34.9 g. of 2,2-dimethyl-3-ethoxyoxetane, B.P. 67.5° C./65 mm., $n_D^{20}=1.4103$. The material analyzed as follows:

Found (percent): C, 64.59; H, 10.85, Calculated (percent): C, 64.58; H, 10.84.

EXAMPLE 2

Acetone (250 ml.) and vinyl butyl ether (90 g.) were charged into an internally water-cooled quartz reactor under a blanket of nitrogen and were irradiated for 24 hours with the mercury lamp described in Example 1. Unreacted starting material was recovered by distillation at atmospheric pressure through a short Vigreux column and the residue was distilled in vacuo to yield 71.2 g. of isomeric oxetanes, B.P. 60–80° C./20 mm. Distillation of this mixture on a spinning band column afforded 24.7 g. of 2,2-dimethyl-3-n-butoxyoxetane, B.P. 70° C./16 mm., $n_D^{20}=1.4200$. The material analyzed as follows:

Found (percent): C, 68.13; H, 11.55. Calculated (percent): C, 68.31; H, 11.47.

EXAMPLE 3

Acetone (250 ml.) and phenyl vinyl ether (75 g.) were charged into the reactor and irradiated as in Example 1 for 24 hours. A brown film of polymeric material had deposited on the walls surrounding the lamp during this period. The acetone was evaporated in vacuo and the residue was distilled to afford unreacted phenyl vinyl ether and a mixture of isomeric oxetanes, of the formula

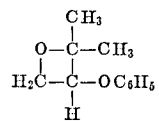

and

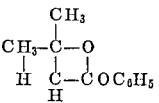

boiling point 100°–110° C. at 8 mm.

EXAMPLE 4

Cyclohexanone (125 g.) and ethyl vinyl ether (250 ml.) were placed in the reactor and irradiated as described in Example 1. There was obtained 61 g. of isomeric oxetanes which upon fractionation gave 31.5 g. of pure 3-ethoxy-1-oxa-spiro[3.5]nonane, B.P. 72° C./4 mm., $n_D^{20}=1.4553$.

Found (percent): C, 70.58; H, 10.59. Calculated (percent): C, 70.54; H, 10.66.

EXAMPLE 5

Cyclohexanone (100 g.) and butyl vinyl ether (250 ml.) were charged in the reactor and irradiated as in Example 1. There was obtained 55 g. of reaction mixture which upon fractionation on a spinning band column gave a total of 17 g. of pure 3-n-butoxy-1-oxaspiro[3.5]nonane, B.P. 88.5° C./1.6 mm., $n_D^{20}$=1.4555.

Found (percent): C, 72.58; H, 11.18. Calculated (percent): C, 72,68; H, 11.18.

EXAMPLE 6

Freshly distilled benzaldehyde (80 g.) and vinyl ethyl ether (350 ml.) were charged into a reaction flask under a blanket of nitrogen and irradiated with an internally water-cooled Pyrex reaction with a 450 W medium pressure mercury lamp for 21 hours. Excess vinyl ethyl ether was distilled off at atmospheric pressure and the residue distilled in vacuo to yield 115 g. of a mixture of oxetanes, B.P. 67°-75° C./0.3 mm. Two fractions having a B.P. of 65°/0.2 mm. and 75°/0.4 mm. analyzed as follows:

Fraction 1, found (percent): C, 7403; H, 8.05. Fraction 2, found (percent): C, 74.33; H, 8.14. Calculated (percent): C, 74.13; H, 7.92.

EXAMPLE 7

Freshly distilled acetophenone (50 g.) and ethyl vinyl ether (175 ml.) were charged into the reactor and irradiated for 24 hours as described in Example 6. Evaporation of the ethyl vinyl ether left a residue that was separated into unreacted acetophenone and a mixture of isomeric oxetanes, B.P. 70°–90° C. at 0.3 mm., of the formula

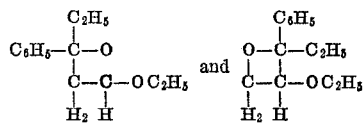

EXAMPLE 8

Benzophenone (45.5 g.) and vinyl butyl ether (250 ml.) were irradiated as in Example 6 for 16 hours. The butyl vinyl ether was distilled off at room temperature and the residue distilled in vacuo to afford unreacted benzophenone, and a fraction of boiling point 120°-130° C. at 0.1 mm. that was shown to consist of diphenyl butoxy oxetane by IR and NMR.

It will, of course, be apparent to those skilled in the art that modification other than those set forth in the above examples can be employed in the process of this invention, without departing from the scope thereof.

What is claimed is:

1. A process for the production of alkoxyoxetanes which comprises forming a mixture of a vinyl ether of the formula

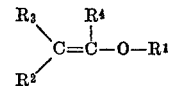

wherein $R^1$ is a monovalent hydrocarbon radical and $R^2$, $R^3$ and $R^4$ are H or an $R^1$ group and a cycloaliphatic carbonyl compound of the formula $C_nH_{2n-2}$=O where $n$ is an integer of from 4 to 18, or a carbonyl compound of the formula

wherein R is a member of the class consisting of alkyl groups containing from 1 to 18 carbon atoms and aryl groups and R' is hydrogen or an R group, and subjecting said mixture to ultraviolet irradiation whereby said carbonyl compound and said vinyl ether react to form said alkoxyoxetanes.

2. A process as in claim 1 wherein the carbonyl compound is acetone and the ether is ethyl vinyl ether.

3. A process as in claim 1 wherein the carbonyl compound is cyclohexanone and the ether is vinyl butyl ether.

4. A process as in claim 1 wherein the carbonyl compound is cyclohexanone and the ether is vinyl ethyl ether.

5. A process as in claim 1 wherein the carbonyl compound is benzaldehyde and the ether is vinyl ethyl ether.

6. A process as in claim 1 wherein the carbonyl compound is acetophenone and the ether is vinyl ethyl ether.

References Cited

UNITED STATES PATENTS

| | | | |
|---|---|---|---|
| 2,995,571 | 8/1961 | Harris | 204—158 |
| 3,346,655 | 10/1967 | Lester | 204—158 |

HOWARD S. WILLIAMS, Primary Examiner